March 6, 1951 G. P. HERRICK 2,544,497
MULTIPLE FLIGHT AIRCRAFT
Filed June 16, 1945 3 Sheets-Sheet 1
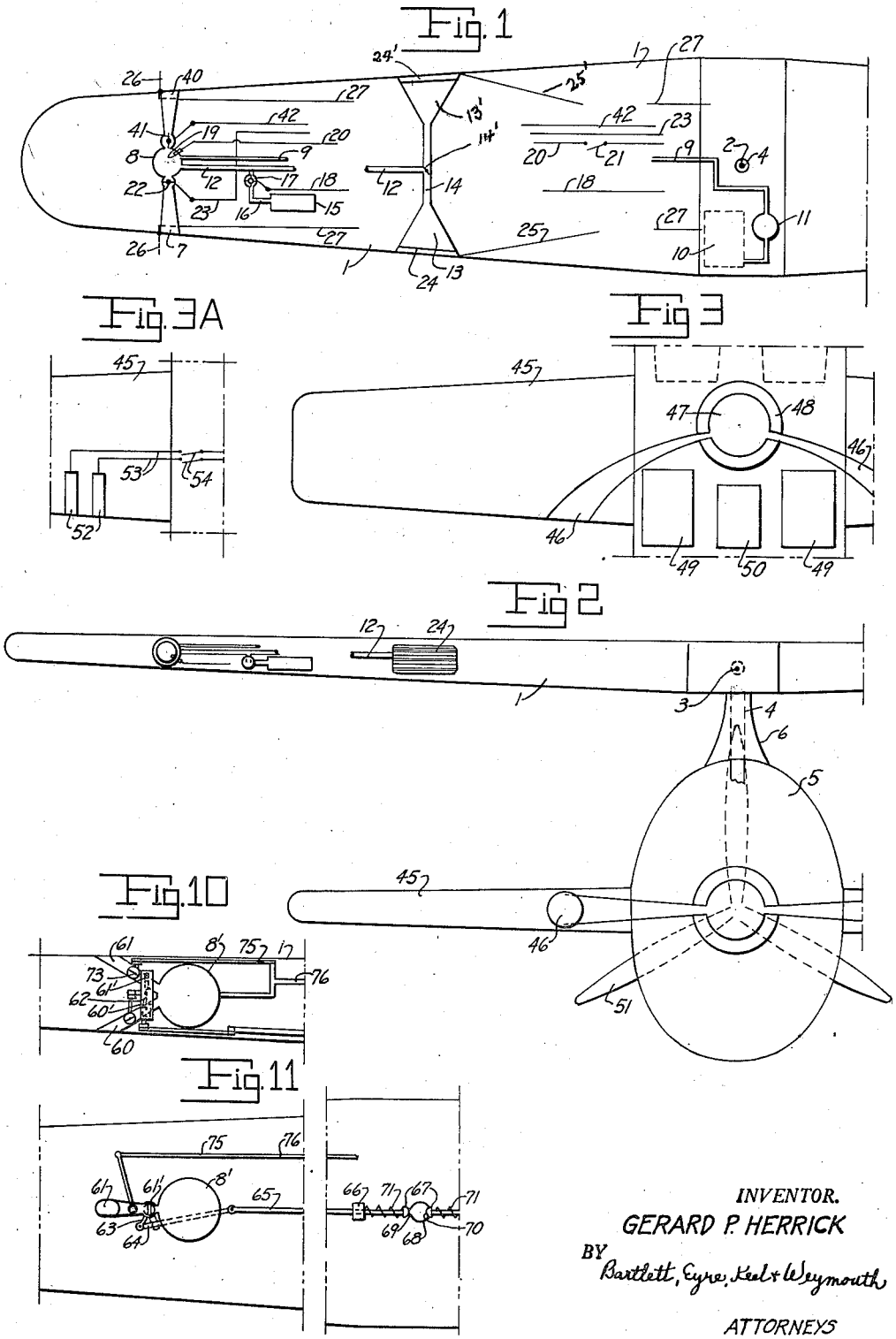
INVENTOR.
GERARD P. HERRICK
BY Bartlett, Eyre, Keel & Weymouth
ATTORNEYS March 6, 1951 G. P. HERRICK 2,544,497
MULTIPLE FLIGHT AIRCRAFT
Filed June 16, 1945 3 Sheets-Sheet 2
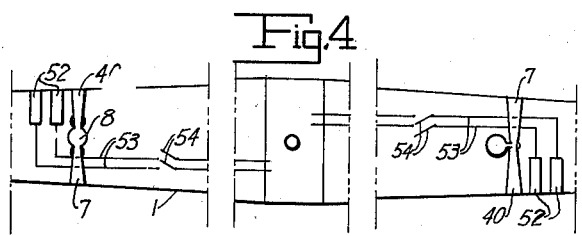
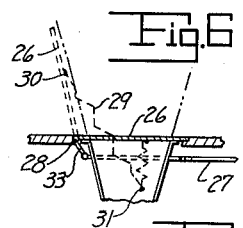
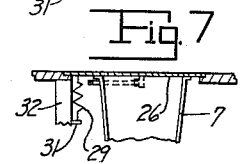
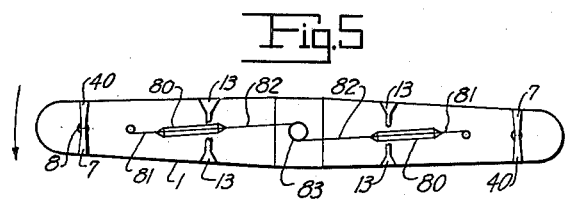
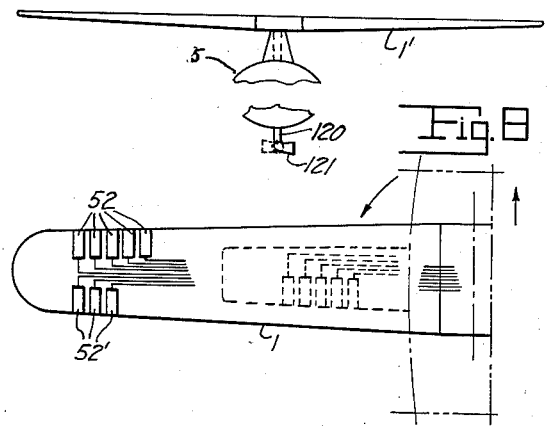
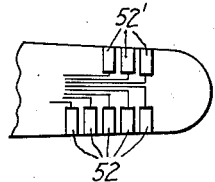
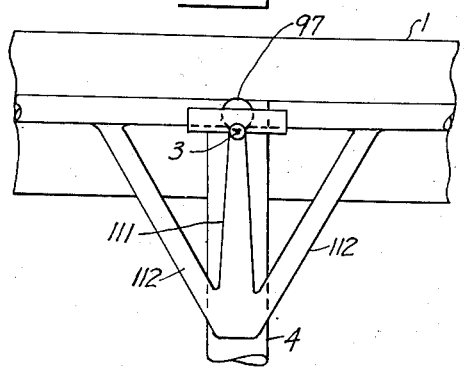
INVENTOR.
GERARD P. HERRICK
BY Bartlett, Eyre, Keel & Weymouth
ATTORNEYS March 6, 1951  G. P. HERRICK  2,544,497
MULTIPLE FLIGHT AIRCRAFT
Filed June 16, 1945  3 Sheets-Sheet 3
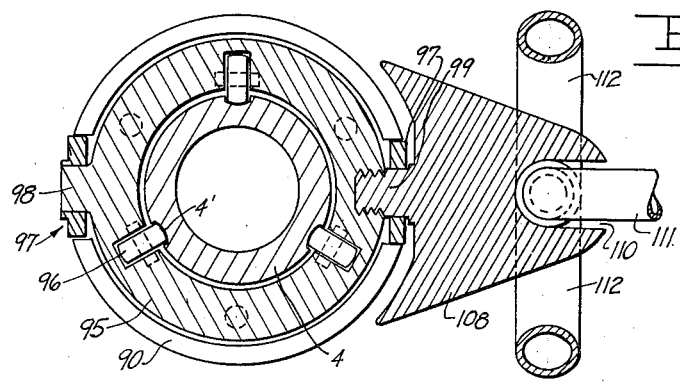
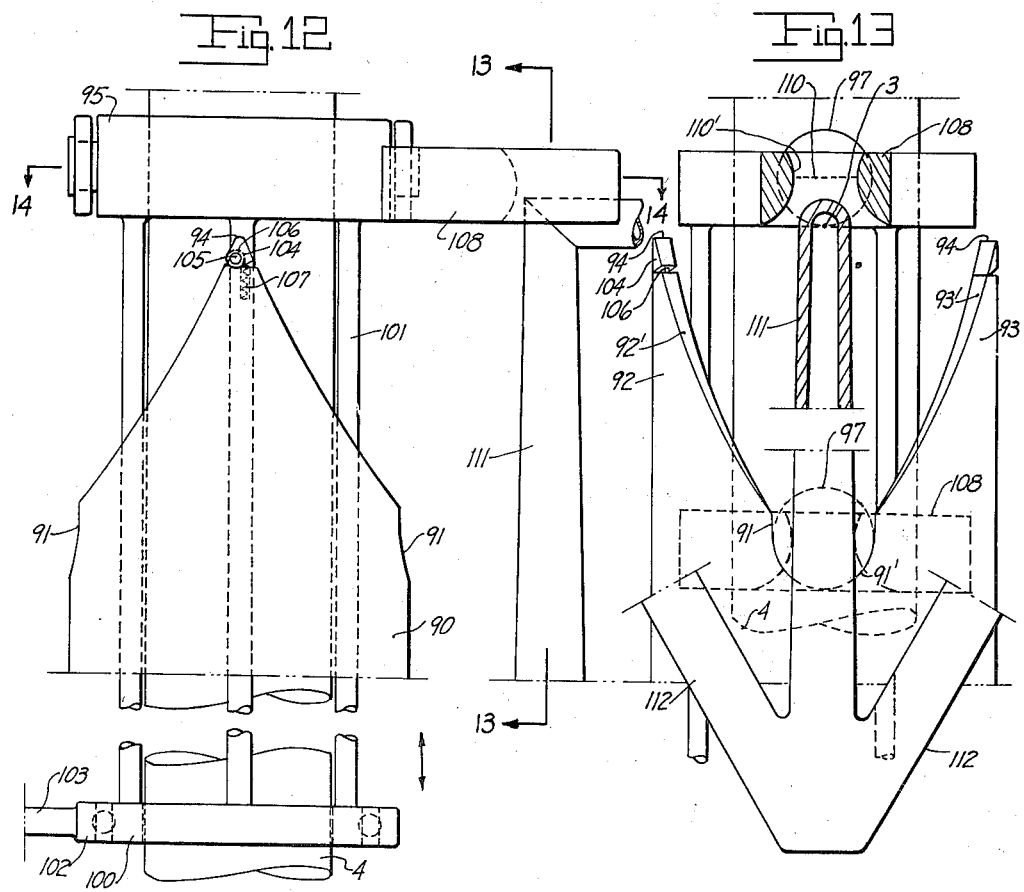
INVENTOR.
GERARD P. HERRICK
BY
Bartlett, Eyre, Keel & Weymouth
ATTORNEYS Patented Mar. 6, 1951

2,544,497

UNITED STATES PATENT OFFICE 2,544,497

MULTIPLE FLIGHT AIRCRAFT

Gerard P. Herrick, New York, N. Y.

Application June 16, 1945, Serial No. 599,807

4 Claims. (Cl. 244—7)

This invention relates to airplanes which are operable either as a fixed plane type of craft or as a rotary wing type of craft.

One object of the invention is an airplane of this character which may be easily converted from one type of craft to the other while in the air.

In converting from a rotary wing craft to a fixed wing type of craft while in the air one of the difficulties encountered is that of arresting the rotation of the wing quickly enough and without undue strain on the craft structure. The inertia of the rotating wing is large and therefore requires large braking forces in order to quickly arrest the rotation against the inertia forces and also any auto-rotating forces of the air which may be applied to the wing at the instant of conversion. When these braking forces are applied at the axis of rotation of the wing the braking forces required are unduly large due to the long leverage at which the inertia forces are applied and the plane structures need to be of correspondingly heavier construction in order to transmit these braking forces from the central axis through the wing. The provision of conventional mechanical braking mechanisms applied at the axis of the rotating wing must be capable of applying the large braking forces necessary for a quick stoppage of the wing and correspondingly heavy braking mechanisms, and this, together with the heavier plane structure required, would be at the expense of paying load.

I overcome these difficulties in the conversion to a fixed wing type by devising a braking means embodying the principle of reaction jets and mounting and distributing or locating these braking units at suitable points in the leading edges of the rotating wing halves for arresting rotation of the wing. This has the advantages, among others, of applying the braking forces more nearly in line with the rotating inertia and auto-driving forces and thereby eliminating or minimizing the lever arm of application of these forces, with the jet reaction braking forces being applied at the most efficient point or points of application with reduction of the braking forces required and with structures embodying minimum weight. One or more of these jet reaction brake units may be located on the leading edges of the wing halves and when more than one jet is employed per half, they are distributed along the leading edge so as to apply the jet reaction braking forces with a maximum of efficiency and minimum strain on the rotor. This also has the advantage that the maximum braking force of the jets is instantly applied the moment the jets begin operating so as virtually to approach if not effect an instantaneous stoppage from maximum rotation of the wing, thereby obtaining continuous efficient operation of the plane as a rotary wing craft up to the instant of conversion and the strain on the wing structure is minimized by this location of the braking forces at points on the leading edge disposed intermediate the wing tip and the axis of rotation. The jet reaction brake means also has the advantage of lightness in weight for the braking power plant and in its simplicity of construction, operation and control.

A further object of the invention is a convertible craft of the character set forth wherein the rotary wing is started in rotation upon conversion from fixed wing operation by jet propulsion means disposed at the trailing edges of the rotor halves, whereby a quick and efficient starting of the rotor is effected, with minimum strains on the craft structure and with freedom from rotating torque between the rotor and the body of the craft.

A further object of the invention is the rotation of the rotor by jet propulsion means disposed at the trailing edges of the rotor halves, when the craft is operating as a helicopter, as for example by the starting jets, and this eliminates the necessity for the conventional anti-torque power means employed in conventional helicopters and otherwise simplifies the driving of the rotors.

A further object of the invention is a craft of the above indicated character wherein the rotor is operable either as an auto-rotating rotor or as a helicopter.

A further object of the invention is a craft of the above indicated character having a rotor mounted for pivotal movements in vertical planes as it rotates.

During the conversion of the rotor wing the strains are large upon a non-pivoting rotor and in a pivoting rotor the angle of pivotal movements is apt to be excessive with resultant high rolling movements and dangerous strains on the structure and I have devised means for limiting the strains and cushioning the pivotal movements and limiting them to angles which are not excessive. One such cushioning means comprises one or more shock absorbing and resisting units embodying the principle of jet reaction which are disposed either on the upper or lower sides of the rotor halves at points outboard thereof with the axis of the jet nozzles directed to deliver cushioning and limiting forces operating vertically or at an angle to the horizontal. In the case of the non-pivoting rotor one or similar units may be provided for minimizing the strains.

A further object is the control of such cushioning jets in a manner to apply the cushioning forces at the predetermined points in the circular path swept by the rotor.

For a better understanding of the invention reference may be had to the drawings forming a part of this application, wherein Fig. 1 is a diagrammatic view in plan of a half of the rotary wing;

Fig. 2 is a front view thereof;

Fig. 3 is a plan view of the fixed wing when embodied in the craft, diagrammatically illustrating propulsion means;

Fig. 3A is a plan view of a modification;

Fig. 4 is a plan view diagrammatically illustrating a modification;

Fig. 5 is a plan view of a modification;

Figs. 6 and 7 are detail views of the control of the jet nozzle outlets;

Fig. 8 is a plan view diagrammatically illustrating another modification;

Fig. 9 is a front view of another modification;

Fig. 10 is a view illustrating a further modification;

Fig. 11 is a plan view corresponding to Fig. 10;

Fig. 12 is a diagrammatic view of an alining and leveling means for the convertible lifting surface;

Fig. 13 is a sectional view along the line 13 of Fig. 12;

Fig. 14 is a sectional view along the line 14 of Fig. 12; and

Fig. 15 is another diagrammatic view of the mechanism shown in Figs. 12 and 13.

Referring to Figs. 1 and 2, I have illustrated my invention as embodied in an airplane having a wing 1 which is operable either as a rotary wing or as a fixed wing. This wing is mounted for rotary movement about an axis 2 and when so rotating it may function either as a helicopter supporting rotor or as an air-driven rotor and the latter operation is referred to herein as "gyro" operation, for convenience. The wing 1 is pivotally mounted for pivotal movements in vertical planes by means of the horizontal pivot 3. A vertical shaft 4 is indicated diagrammatically in Fig. 2 which forms a vertical rotating structure for rotating the wing about the vertical axis 2. A fuselage or elongated body 5 is shown and the vertical shaft 4 is mounted for rotation in the frame of the fuselage. A stream-lined housing 6 extends up from the fuselage 5 to the wing 1. The mounting for supporting the wing 1 for rotation in horizontal planes and for pivotal movements in vertical planes is shown diagrammatically since the structure thereof forms no part of the present invention.

It is understood that the wing 1 may be fixed and fastened rigidly transversely of the fuselage 5 for operation as a fixed plane craft and that it may be released for rotation as a rotary wing about the axis 2 and for pivotal movements in vertical planes, as described about the horizontal axis 3, and that any suitable means may be provided for rigidly fastening the wing for fixed plane operation and for releasing the wing for rotary operation while the craft is in the air.

The time element in conversion from one type of operation to the other is of great importance and should be as short as possible, with due regard to other factors. For example, in converting from a rotary type craft to a fixed plane craft it is important that the conversion shall take place quickly, with a minimum of time for the conversion period. In order to arrest the rotation of the wing in such conversion in a minimum time interval and with minimum strains on the craft, I have devised an effective braking means comprising the principle of reaction devices located at the leading edges of the rotor halves and preferably these reaction brakes are disposed on both rotor halves. By distributing two or more of these brakes along the leading edges the braking forces may be utilized with a maximum of efficiency in opposing and counteracting the inertia forces of the rotating wing although in certain cases only one braking jet may be employed. In the drawings (Figs. 1 and 2) I have illustrated only one such brake on a rotor half, namely the braking device 7 which is located outboard of the midway point of the rotor half, but it is understood that two or more may be used for each half. The brakes being thus disposed at the leading edges of the rotor halves and being thus disposed outwardly from the axis of rotation 2, may be utilized to supply the necessary braking power to the rotor to quickly arrest its rotation in conversion from a rotary plane type craft to a fixed plane type craft. The maximum braking power desired may be thus applied to the plane without putting undue strains on the wing frame and the period from beginning of operation of the braking jet or jets to complete stoppage of rotation of the plane may be reduced to a time interval so small as to render the conversion from rotary type to fixed plane type operation with a maximum of safety in conversion.

These reaction braking devices may assume any form capable of effecting a rapid stopping of the rotating surface. They may take the form of one or more gun cartridges mounted to discharge in the direction of rotation either on the leading edge or edges of the rotating surfaces, or in any position so as to impart powerful braking forces to the continued rotation of the surfaces. They may also take the form of conventional rocket motors similarly mounted to quickly brake the rotation and stop the surfaces. They may take the form of conventional reaction jets continuously or intermittently supplied with fuel burning charges issuing from the leading edges of the rotating surfaces or mounted in any other manner to apply powerful braking forces so as quickly to overcome the inertia and aerodynamic forces tending to continue the rotation. It is understood therefore that these reaction braking devices 7 may assume these and any other forms of devices capable of applying forces by reaction effective to quickly arrest the rotation of the surfaces.

When supplied either continuously or intermittently with fuel burning charges, the braking reaction jets 7 may be supplied with combustion charges in any suitable manner. I have diagrammatically illustrated a combustion chamber 8 supplying the fuel charges to the braking jet nozzle. A fuel line 9 leads to the combustion chamber 8 from a fuel supply 10 located, as for example in the central portion of the rotary wing 1 and a pump 11 is shown in this line so as to supply the required amount of fuel through the pipe 9. Centrifugal force due to the rotating wing will assist in supplying the fuel to the combustion chamber 8. The air for the combustion charge is supplied through the pipe line 12 and a funnel or scoop 13 is shown in the leading edge of the rotor halves for scooping up air and supplying it to the pipe supply line 12 through an interconnecting pipe 14. An auxiliary oxygen tank 15 is also shown for supplying the pipe 12 oxygen when needed, the oxygen flowing through a pipe 16 to the pipe 12 and a manually or otherwise controlled valve 17 is disposed in this pipe 16. A manual control for the valve 17 is diagrammatically shown at 18. I have also shown diagrammatically an electric ignition plug or means 19 disposed in the combustion chamber 8 and an electric supply line 20 with a control switch 21 therein is diagrammatically shown for supplying electric ignition energy to the igniting means 19. If desired the jet 7 may be provided with a control valve 22 for controlling or regulating the supply of fuel charges from the combustion chamber 8 to the jet 7 and at 23 I have shown diagrammatically a manual or other suitable control for operating this valve 22.

When the wing 1 is operating as a fixed wing craft it is desirable that the opening of the air funnel or scoop 13 be closed and I have shown diagrammatically such a means at 24. This closure 24 may be of any type, as for example of the louvre type indicated diagrammatically in Fig. 2, or like the closures 26 of Figs. 1, 2, 6 and 7, and I have shown at 25 a means for operating this closure 24. It is also preferable that the opening of the jet 7 be closed at all times except when the craft is being converted from a rotary plane type to a fixed plane type. Such a closure is shown diagrammatically at 26 and a manual control comprising a rod 27 is provided for operating the closure 26. This closure 26 which is shown diagrammatically in Fig. 1 may be of the structure illustrated in Figs. 6 and 7. Referring to these figures the closing lid 26 is pivotally mounted at 28 to a part of the rotor frame and is biased to closed position by a spring 29 which is fastened at 30 to the closure 26 and at 31 to a pin carried by the frame element 32. By this means when the braking jet 7 begins to operate the closure 26 is opened automatically by the pressure of the jet against the tension of the spring 29 but when the jet 7 is discontinued in operation the closure 26 is again closed by the spring 29. This closure 26 may also be operated manually by the control rod 27, the latter being pivotally attached to an arm 33 fastened to the pivotal shaft of the closure 26. Thus by means of this rod 27 the closure 26 may be opened during the operation of the braking jet and closed when the wing is arrested in its rotation.

The craft may therefore be converted from a rotary plane to a fixed plane type in a period of time so short as to approximate instantaneous conversion thereby contributing to the safety during conversion. The utilization of a brake embodying the jet reaction principle for stopping the wing during conversion has the advantage, among others, that it functions without transmitting to the fuselage or frame of the plane a twisting torque and accordingly no appreciable interfering or upsetting control forces result from this braking means, which is not true of conventional mechanical braking between the body of the craft and the rotating wing. The jet reaction braking forces are also more efficiently applied in that these forces are more nearly in line with the rotating inertia forces as compared with the conventional mechanical braking means located at the axis of rotation. The braking jets need therefore be of comparatively small power and the further they are removed from the axis of rotation the more efficient they are because of the relatively higher speed. The lesser strains put upon the structure by the utilization of the jet brakes renders it possible to design frame structures of lesser weight or with greater factor of safety and with increase in paying load.

It is also important in converting from fixed plane to rotary plane operation that the motor be started and brought up to a rotary assisting speed in the shortest time practicable and for converting from a fixed plane to rotary plane operation I utilize jet propulsion motor means disposed at the trailing edges of the plane halves. One or more such jet propulsion units may be provided for each rotary plane half and when two or more such units are provided for each plane half, for dependability or power or distribution, they may be disposed closely adjacent each other or spaced from each other outwardly from the central axis of rotation. Referring to Figs. 1 and 2 I have shown one of these jet power propulsion units at 40. These propulsion units 40 may be supplied with combustion charges from separate combustion chambers or from the same combustion chambers 8 which supplied the braking jets 7. I have diagrammatically illustrated the units 40 as being supplied with combustion charges from the combustion chamber 8. These units 40 are provided with a control valve 41 disposed between the chamber 8 and the jet 40 for closing the jets 40 off from the combustion chamber 8 when the braking jets 7 are operating and a manual or other means 42 is diagrammatically illustrated for operating the control valve 41. When the braking jets 7 are not operating the valves 22 are closed.

Thus through the jet propulsion units 40 the wing 1 may be started and brought up to rotary sustaining operation very quickly and with minimum strains on the rotary plane and on the craft. There is not transmitted to the fuselage a twisting torque and the wing may be started without undue strains and upsetting forces being set up. When the speed of the plane or wing is high enough to reach the gyro operating stage the propulsion units 40 may be discontinued and the craft operated as a gyro with the plane or wing 1 pivoting about the horizontal axis 3 as it rotates. If it is desired to operate the craft as a helicopter the propulsion units 40 are continued in operation. The rotary plane or wing is thus driven in a manner to avoid the transmission of the twisting torques to the fuselage and the conventional counter-torque means proposed for helicopters is rendered unnecessary. By utilizing jet propulsion units 40 for starting and driving the rotary plane or wing 1 other advantages are obtained, as for example, the elimination of the mechanical drive at the central axis of rotation 2, the elimination of the long leverage for the application of rotating power from the central axis, the provision of a starting and driving power plant which is characterized by its lightness of weight, and this driving means renders practicable the designs of lesser weight with greater factors of safety and with increased paying loads. Also as shown and above described, the same supply and fuel charge forming means may be utilized for both the braking jets and the propulsion units.

The propulsion units 40 may be provided with a means for controlling the jet openings similar to that shown in Figs. 6 and 7 and described above.

In the particular embodiment of the craft shown in Figs. 1 and 2 I have provided a fixed wing 45 disposed beneath the convertible wing 1. This fixed wing 45 is in the embodiment shown of lesser length than the span of the convertible wing 1. In this embodiment I have illustrated jet propulsion means for propelling the machine through the air. For this purpose I have illustrated a pair of jet propulsion nozzles 46 disposed at the trailing edges of the wing 45, one on either side of the fuselage 5. These jets extend forwardly and inwardly towards the central fore and aft axis of the fuselage and are supplied with combustion charges from a combustion chamber shown diagrammatically at 47. A conventional cooling chamber 48 is disposed about the combustion chamber 47. Conventional fuel tanks 49 and pumps 50 are illustrated for supplying fuel charges to the chamber 47.

Also in Figs. 1 and 2 I have shown a conventional propeller 51 which may be driven by a conventional internal combustion engine disposed in the fuselage 5 for propelling or assisting in propelling the craft through the air. The propulsion jets 46 may be employed alone for propelling the craft through the air as a fixed plane craft or they may be utilized for propelling or assisting in propelling the craft translationally when the craft is operating as a rotary plane type. These propulsion jets 46 may be utilized at all times for propelling or assisting in propelling the craft or they may supplement the propeller 51 for assisting in the take-off of heavy loads with short distance runs or for obtaining bursts of speed in flight when the demand arises for such bursts of speed. Also propulsion jet nozzles are provided on the trailing edge of the rotor wing which assist the propeller 51, the jets 46, and the rockets when the wing is fixed.

In the embodiment of Fig. 3A I have illustrated starting rockets 52 for assisting in propulsion of the craft, as for example for assisting in taking off under heavy loads. These rockets 52 may be controlled by the ignition circuits 53 having control switches 54 therein. Such rocket jets may also be used for starting and stopping and cushioning the rotor.

In conversion from fixed plane operation to rotary plane operation, after the release of the means locking against oscillating or pivotal movements in vertical planes, the oscillating angles of the plane before it reaches its maximum gyro rotating speed tend to become excessive at certain positions of the plane in its rotary sweep as previously mentioned. These excessive angles tend to put an undue strain on the mounting and frame of the craft and it is advisable to cushion the pivoting movements at the permitted limits of oscillation so as to minimize the strains on the craft and to avoid upsetting control forces being imparted to the craft.

In Figs. 10 and 11 I have illustrated a novel and improved means for controlling or neutralizing the moments of the wing 1 about the axis 3 during this conversion operation. This means embodies one or more jet reaction nozzles supplied with fuel charges in any suitable manner and directed in a manner to oppose the tendency of the wing 1 to assume angles about the pivotal axis 3 and so balance and/or increase the rotor lift. These nozzles are disposed outboard of the central pivotal axis 3 so as to obtain the desired leverage for the action of the nozzles. These nozzles may be disposed on both sides of the axis 3 or they may be disposed on only one side. Likewise they may be disposed either on the upper surface of the wing or on the lower surface or on both. In the embodiments shown in Figs. 10 and 11 I have illustrated a pair of nozzles 60 and 61 disposed on one-half of the wing 1, the nozzle 60 opening through the lower surface and the nozzle 61 opening through the upper surface of the wing 1 and each of these nozzles is directed at an angle to the horizontal so as to apply a force opposed to pivotal movements generally in the direction of the nozzles. In the particular embodiment shown the nozzles are disposed at acute angles to the horizontal for convenience of construction and arrangement although the nozzles would naturally have greater effect if they were directed vertically or nearly vertically. The arrangement is such that the nozzle 60 becomes operative or is supplied with a fuel charge at that point in the revolution of the wing 1 where this particular wing half tends to assume its lowest position, and the nozzle 61 at that point in the revolution where this wing half tends to assume its highest position. To accomplish this purpose I have illustrated diagrammatically a pair of controlling valves 60' and 61' which are disposed in the nozzles in a manner to open and close them by some operative means. The valves are mounted on a control shaft 62 and this control shaft 62 is oscillated by a lever arm 63 through a connecting link 64 and a reciprocating rod 65. The latter extends through a guide 66 for guiding the rod 65 in its reciprocating movements. The end of the rod is provided with a shoulder 67 having a rounded surface and this end of the reciprocating rod 65 is biased to engaging position with a stationary track 68 having on one side a raised cam surface 69 and on the opposite side a depression 70 forming also a cam surface. A spring 71 having one end engaging the guide 66 and the other end engaging the shoulder 67 yieldingly bias the shoulder 67 against the stationary track 68. In the particular embodiment shown the shoulder 67 of the mechanism on the wing half illustrated in Figs. 10 and 11 is now just riding over the raised cam surface 69 to close the nozzle 61 and to open the nozzle 60 so as to cushion the depression of this half of the wing. When this particular wing half reaches the diametrically opposite point illustrated from that in Figs. 10 and 11 wherein the wing half is tending to rise too far, the reverse control of the nozzles 60 and 61 is effected, whereby the nozzle 61 is opened and the nozzle 60 is closed and this is effected by the shoulder 67 dropping into the recessed cam 70. In the particular embodiment shown the nozzles 60 and 61 are duplicated on the wing halves together with their control means, both controls being operated by the stationary cam 68.

The nozzles 60 and 61 may be supplied with fuel charges in any suitable manner as, for example, by the fuel chamber 8' similar to the fuel chamber 8 of Fig. 1, together with the fuel supply means and control shown in connection therewith which are omitted from Figs. 10 and 11 for convenience in illustration. This fuel chamber 8' may be the same fuel chamber as chamber 8 shown in Fig. 1 for supplying the jet nozzles 7 and 40, these nozzles 7 and 40 also being omitted from Figs. 10 and 11 for convenience in illustration.

Ordinarily the nozzles 60 and 61 would need to be in operation only during the starting and stopping periods in converting from fixed wing flight to rotary flight and vice versa, when the difference in lift between the advancing and retreating blades is excessive. However under conditions where this excessive difference exists in continuous flight the invention could be utilized. Any suitable control for cutting in and out these nozzles 60 and 61 may be provided as, for example, the manually controlled valves 73 which may be manually operated by the diagrammatic means indicated at 74, 75 and 76.

In the embodiment of Fig. 4 the convertible lifting surface 1 is provided with the jet reaction braking nozzle 7 and the jet propulsion nozzles 40 like Fig. 1, certain of the mechanisms being omitted in Fig. 4 for convenience in illustration. This embodiment also has the starting rockets 52 for conversion from fixed surface to rotary surface operation and by the use of such starting means the oxygen supply 15, 16 and the controls 17 and 18 may be omitted from the embodiment of Fig. 4 since the surface may be brought up to sufficient speed to take in the required amount of air through the scoops 13 for forming the fuel charges without the necessity of the extra oxygen supply. The jet propulsion nozzles 40 may in this case be used only for jet propulsion after starting but they may be used to assist the rockets 52 after the latter have brought wing up to sufficient speed to get the required air through the scoops 13.

In the embodiment of Fig. 5 the use of the oxygen supply 15, 16 of Fig. 1 may also be dispensed with since an auxiliary starting means is illustrated. This auxiliary starting means is in the form of an elastic tension motor 80, this motor being duplicated in each wing half and provided with fastening connections 81 on one side to the wing structure and on the other side or end with cables 82 wound about the drum 83 which is mounted so as to start the wing from rest and bring it up to the required rotating speed to be picked up by the auto-rotating forces. This tension starter may be utilized also as a brake for assisting in the stopping of the rotating wing upon conversion from rotary operation to fixed wing operation. This tension motor 80 may be of the type illustrated in my application, entitled Aircraft Operable Either as Fixed or Rotary Lifting Surface Type, Serial No. 596,986, filed June 1, 1945, now U. S. Patent No. 2,518,007, and for a more detailed description of its structure and the mechanism associated therewith for assisting in starting the wing and for assisting in stopping the wing reference may be had to said application.

In the embodiment of Fig. 8 I have illustrated convertible lifting surface 1 as provided with a multiplicity of rocket motors 52 and 52', each rocket being in the form of an individual power unit of the desired traction power with the units being adapted to be used in succession as the rocket motors successively lose their power, that is one rocket or a group of rockets containing two or more may be utilized simultaneously to furnish the required power with other units or groups of units to be put in operation successively as the units are depleted of their power or if one fails another can act. In Fig. 8, for example, I have shown the wing 1 as provided with a multiplicity of rocket power units 52, there being illustrated five on each wing half but it being understood that as many of these units may be employed as may be desired. These groups of units 52 are utilized for starting the wing 1 in rotation in conversion from fixed surface to rotary surface operation and may also be used as the power means for rotating the wing 1 in helicopter operation. The fore and aft opposite sides of the wing or lifting surface 1 are provided with a multiplicity of similar rocket units 52' and one or more of these may be used for arresting the rotation of the lifting surface 1 in conversion from rotary to fixed operation. The units 52 on one wing half and 52' on the other wing half may be utilized in succession for traction as a fixed surface craft either by themselves or to assist other traction means provided such, for example, as the nozzles 46 on the permanently fixed wing 45, or the propeller 51 or the rockets 52 of Fig. 3A in the permanently fixed wing.

In the embodiment of Fig. 9 I have shown a convertible lifting surface 1' which differs from the lifting surface 1 described above in that the latter is mounted for pivotal movements in vertical planes about the pivotal axis 3 whereas the lifting surface 1' is not provided with such pivotal axis or pivoting movements.

For controlling or neutralizing the rolling moment due to the unequal lift of the rotor halves of the rotor 1' on opposite sides of the axis, reaction jet mechanisms of the character shown in Figs. 10 and 11 may be provided in Fig. 9 for applying moments opposing the rolling moments and thereby stabilizing the craft. It is understood that the reaction jets 60 and 61 of Figs. 10 and 11 are diagrammatically shown and are intended to apply to either a conventional jet supplied continuously or intermittently with burning fuel charges under the control of the valves 60' and 61' or they may be of the type of reaction jets of the explosive reaction type such as gun cartridges or they may be of the rocket type. In certain cases one of the two latter types of reaction devices may be preferred because of the ease of control to get the reacting power desired and with the certainty and promptness desired.

In Fig. 9 I have schematically shown reaction devices 121 mounted to oppose the rolling moment applied to the craft. Only one such reaction device is illustrated in Fig. 9, for convenience in illustration, and it may be mounted on the fuselage 5 and in the particular embodiment shown it is illustrated as carried by a hollow support 120 from the bottom of the fuselage. The hollow support 120 may be utilized for supplying continuously or intermittently fuel charges to the reaction device 121 where the latter is a conventional reaction jet nozzle or the support 120 may be utilized for the controls leading to the reaction device 121 if the latter are explosive cartridges or are conventional rockets. It is important that the opposing or neutralizing action of the reaction device or devices 121 be controlled to apply a force to the craft sufficient to keep within safe limits the unbalanced rolling moments at the times they occur. For ease of control in getting a practically instantaneous reaction similar to the reaction or kick when a gun is fired, the gun cartridge or rocket type of reaction device may be preferred. A cam device may be employed in Fig. 9 for controlling the reacting devices 121 similar to the cam 68 and the controlling mechanism shown in Fig. 11 for firing the cartridges and the rockets at the desired instants or points in the revolution of the rotor. In this case a chamber similar to the chamber 8 may be utilized in which is built up or accumulated pressure during the greater part of the revolution and which is periodically discharged at the proper moment to balance the opposite rolling moment described. In Fig. 9 I have illustrated the reacting devices 121 as being shiftable to vary the angles of the kick delivered by the reacting devices. For example, I have illustrated the devices 121 as rotatable through an angle of 180° from one lateral horizontal position to the other.

In the embodiment of Fig. 1 and other embodiments illustrated the jet propulsion nozzle or nozzles 40 on one wing half and the jet propulsion nozzle or nozzles 7 on the other wing half may be utilized for propulsion while the craft is operating as a fixed surface craft, thus assisting any other traction means provided as, for example, the jet propulsion nozzles 46 and/or the propeller 51. In this form of ship there is a tendency for the integrated line of drag not to coincide with the integrated thrust line by reason of, for example, superstructure. Thus there is a tendency to oblige the use of power to keep the ship in a desired line of flight. To overcome this, a line of thrust may be established with a component approximately equal to the unbalanced line of drag from such superstructure by the proper inclination of jets 7 and 40. These jets may be adjustable in direction, if desired.

Any suitable means may be utilized for orienting and locking the convertible surface for fixed surface flight. For example, I have illustrated in application entitled Convertible Aircraft, Serial No. 596,987, filed by me on June 1, 1945, now U. S. Patent No. 2,518,008 (and also in the above mentioned application) alternative means for such orientation and locking and it is understood that either of such orientation and locking means set forth in those two applications may be utilized with the structure shown in this application. It is understood however that I am not limited to either of the particular means shown in those applications. I have also shown an alternative orienting and locking means in this application and this alternative means is illustrated in Figs. 12, 13, 14 and 15.

In these figures the hollow shaft carrying the convertible wing is indicated at 4 and the pivotal axis about which the convertible wing 1 pivots in vertical planes is indicated at 3 in Fig. 13. Around the shaft 4 upon which the convertible wing 1 is mounted is disposed a tubular frame member 90, it being understood that this tubular frame member 90 is fixed to the frame of the craft. This tubular frame member is provided with recesses 91 disposed on the opposite sides thereof and the tubular frame member 90 is provided with oppositely positioned tapered extensions 92 and 93 extending upwardly from the recesses 91, and these tapered extensions thus provide tapered surfaces 92' and 93' respectively on these extensions. The pair of cam surfaces 92' merge at the top at 94 and likewise the pair of cam surfaces 93' merge at the top at a similar point 94. These cam surfaces merge at the bottom at the side walls of the recesses 91 which recesses are provided in the particular embodiment shown with a circular bottom 91'.

The shaft 4 which carries and supports the convertible wing is provided with a locking means which cooperatively functions with the tubular frame member 90 to aline and lock the wing in the fixed surface operating position. This locking means comprises an annular ring or collar 95 which is mounted for relative vertical movement on the shaft 4. This collar is preferably provided with frictionless rollers 96 which engage the exterior of the shaft 4 and these rollers 96 are indicated as following grooves 4' formed on the exterior and longitudinally of the shaft 4. This collar 95 is provided with a pair of alining and locking members 97 disposed adjacent to and exteriorly of the periphery of the collar which members cooperatively function with the extensions 92 and 93 of the fixed frame member 90 and the recesses 91 to aline and lock the wing in fixed surface operation position when the collar 95 is moved downwardly. In this operation the alining is facilitated by these members 97 engaging and following the cam surfaces 92' and 93' until they are disposed in the recesses 91. In the particular embodiment shown these members 97 are in the form of wheels or rollers journaled on stud shafts 98 and 99, the former being illustrated as formed integrally with the collar 95 and the latter being screw-threadedly attached thereto. The alining and locking operation is effected by lowering the collar 95 on the shaft 4. If the wing is properly alined when the collar 95 is lowered the rollers 97 enter the recesses 91 to firmly lock the wing in fixed position. If the lifting surface is not alined the rollers 97 engage the cam surfaces 92' and 93' to impart to the wing a partial rotation to bring it into proper alinement, the rollers finally entering the recesses 91.

The collar 95 may be operated from the full line position shown in Fig. 12 which is the rotary operation position to the fixed locking position by any suitable means and in the particular embodiment I have illustrated a vertically movable ring 100 surrounding the shaft 4 and fastened to the collar 95 by means of three rods 101. The ring 100 and the collar 95 thus move as a unit. There is journaled to the ring 100 a ring 102 in such manner that the rings may relatively rotate with respect to each other but fixed against relative movement longitudinally of the shaft 4. In order to operate the collar 95 from one position to the other it is only necessary to operate the ring 102 and this may be done by a manually or otherwise operated operating member 103 which is rigidly fastened to the ring 102.

In order to avoid any possibility of the alining means 97 engaging the extensions 92 and 93 at the point 94 in a manner such that the collar will be held in that non-alined position without the rollers engaging the cam surfaces 92' and 93' I have provided an eccentrically pivoted member 104 pivoted at 105 to a tongue 106 formed on the extensions 92 and 93. This member 104 is held in the position illustrated in full lines in Fig. 12 by a suitable engaging spring 107 engaging the member 104 at one end and disposed in a recess formed in the extensions 92 and 93. The arrangement is such that if the rollers 97 should engage the points 94 the members 104 being eccentrically pivoted are shifted over to avoid any possible dead center condition, the rollers 97 being thereby shifted to one side to follow the cam surfaces 92' and 93'.

In the particular embodiment shown the stud or stud shaft 99 is formed on a bracket 108 and thus the latter forms a rigid unit with the collar 95. The bracket 108 is provided with a levelling recess 110 and when the bracket 108 and the collar 95 unit is moved downwardly, this recess gradually brings the wing to a level position if it is not already in a level position, causing a levelling member 111 of the wing frame to be engaged by the curved walls of the opening 110. This frame member 111 is joined at the bottom to two other wing frame members 112 and is gradually tapered in width or diameter in the downward direction so as to permit wing pivoting movements about the axis 3 until the collar 95 and bracket 108 reach their lowermost position where the diameter or width of the frame member 111 is equal to the smallest diameter of the recess 110 formed in the bracket 108, this smallest diameter in the curved walls of the recess 110 being indicated at 110'.

Thus the convertible wing in conversion from rotary to fixed operation may be alined and locked in the fixed surface operating position by the manipulation of the member 103 in a vertical direction. The collar 95 in its lowermost position, namely in the recess 91 of the frame member 90 locks the wing securely against rotation. The bracket 108 which is lowered with the collar 95 gradually reduces the play between the frame member 111 and the walls of the opening 110 to gradually level the wing during the downward movement and in the lowermost position of the bracket 108 the wing frame member 111 together with the wing frame members 112 are securely locked against oscillation about the axis 3.

Thus Figs. 12, 13 and 14 illustrate simple means for orienting, levelling and locking the convertible lifting surface in fixed position with certainty and rapidity. In cases where the lifting surface is not mounted for oscillatory movements in vertical planes the levelling and locking means against pivoting movements is omitted.

Where the means for locking the convertible lifting surface in fixed position set forth in the applications above referred to are utilized in the craft herein shown, instead of the structure illustrated in Figs. 12 to 14, the motor reversing means shown in said applications may be dispensed with since the reaction braking nozzles for arresting the rotation of the rotating surface may automatically function not only to arrest the rotation of the rotating surface but to reverse it thereby cooperatively functioning with the locking means of the other applications in the place of the reversible motors shown therein.

The reaction jet braking means shown herein are automatically discontinued in operation upon the arrest of rotation of the convertible lifting surface due to the lack of adequate supply of air through the air intakes which is also an advantage in control. When the lifting surface is thus arrested in its rotation the locking means shown in Figs. 12 to 14 is brought into operation either manually or responsively to the stopping to effect the orienting, levelling and locking of the surface in fixed position. Any suitable manual means or suitable means acting responsively to the arrest of rotation or stopping of the rotation may be utilized and it is deemed unnecessary to illustrate such means.

In cases where the locking means of the aforementioned application Serial No. 596,987 are employed which requires a reversal of the rotation of the surface for a partial revolution or in cases where the air intake from the atmosphere would be insufficient to produce the fuel charges for the reaction braking jets as the rotary speed approaches zero, the auxiliary oxygen supply for the fuel charges herein illustrated are arranged to come into operation to supplement the air intake and the manual means illustrated may be utilized for this purpose or if desired any suitable means responsive to the slackening of speed may be provided for this purpose.

The rocket and jet propulsion traction arrangements set forth herein facilitate conversion from rotary to fixed surface operation with certainty and safety since the desired increase in traction may be readily obtained therefrom during such conversion.

I have purposely omitted from the drawings of this application any specific description of means for controlling the angles of incidence of the convertible surfaces but it is understood that the rotor halves are variable in angle of incidence and that it is desirable to provide a vertical lift control which varies the angles of the rotor halves equally for control of the vertical lift while operating as a helicopter or driven rotor. It is also desirable to provide for periodic control of the rotor halves as, for example, the controls for varying the angles of incidence of the rotating wing halves at certain points or through certain ranges of each revolution. This control is desirable both for helicopter operation and for gyro or autodriven operation. Any conventional controls or any of the controls set forth in the aforementioned applications may be utilized for this purpose either by themselves or in combination with conventional fixed surface operation controls or the controls of said applications.

It is understood that the braking devices 7 of any of the different types of reaction devices above described may be used for reverse rotation of the rotor, where it is desired to have such reverse rotation as, for example, imparting to the rotor a partial revolution in reverse for orienting the rotor for fixed surface operation as, for example, when using the orienting means described in the above-mentioned applications, Serial No. 596,986 and Serial No. 596,987.

It is understood that if desired rotating power may be applied to the shaft 4 to start rotation of the rotor 1 upon conversion from fixed surface to rotary operation and for this purpose a conventional combustion starter may be employed as, for example, to obviate the necessity of the oxygen tank 15 which has been shown as furnishing the oxygen for the initial charges for the operating jets 40, the scoop 13 now taking in sufficient air for that purpose after starting by the combustion starter.

In Fig. 1 I have illustrated a scoop 13' on the opposite edge of the rotor 1 from the scoop 13 for the purpose of supplying air to the supply pipe 12 when the rotor 1 is rotating clockwise and a valve 14' is shown for connecting either of the scoops 13, 13' with the air supply pipe 12. This valve 14' may also function to disconnect one of the scoops when the other is connected with the pipe 12. The air scoops 13 and 13' on the opposite edges of the rotor 1 would be particularly useful when the rotor 1 is symmetrical, enabling the rotor 1 to operate in either direction.

In Fig. 9 I have illustrated a jet reaction device 121 which is variable in direction for changing the direction of the reaction forces on the craft and it is understood that a similarly adjustable jet nozzle may be used in the place of the nozzles 7 and 40 of Figs. 1 and 4 with the nozzle variable in direction to act as either a propulsion or braking device.

I claim:

1. In an aircraft, a convertible lifting surface operable either as a rotary surface or a fixed surface, braking means for arresting the rotation of the surface comprising a reaction jet nozzle disposed outboard of the surface and at the leading edge thereof, a fuel charge forming chamber in communication with said nozzle and an air supply to said chamber comprising an air scoop at the leading edge of the rotating surface.

2. In a convertible aircraft having a lifting surface convertible from rotary operation to fixed wing operation, a jet motor enclosed in each half of the rotatable wing and having a combustion chamber disposed centrally of the wing, a pair of opposing nozzles connected with the combustion chamber and opening in the leading and trailing edges of the wing and valve means associated with each nozzle to bring into operation one nozzle or the other.

3. In a convertible aircraft having a rotatable wing adapted to be converted to fixed wing operation, a jet motor in each half of the rotatable wing comprising a single combustion chamber disposed centrally of the wing, a pair of nozzles connected with the combustion chamber and opening in the upper and lower wing surfaces at a point beyond the near edge of the combustion chamber and valve means associated with each nozzle for bringing into operation one or the other of the nozzles.

4. In a convertible aircraft having a rotary wing adapted to be converted to fixed wing operation, means for propelling and arresting said wing comprising a plurality of rocket motors on each edge of the wing halves and means to successively fire selected rocket motors for propelling the wing and means upon conversion to selectively fire other of the rocket motors to arrest rotation of the wing and to orient it in the fixed wing position.

GERARD P. HERRICK.

REFERENCES CITED

The following references are of record in the file of this patent:

UNITED STATES PATENTS

| Number | Name | Date |
|---|---|---|
| 1,398,750 | Stewart | Nov. 29, 1921 |
| 1,484,632 | Fales | Feb. 26, 1924 |
| 1,485,704 | Pescara | Mar. 4, 1924 |
| 1,546,313 | Pescara | July 14, 1925 |
| 1,550,106 | Shaw | Aug. 18, 1925 |
| 1,578,168 | Pescara | Mar. 23, 1926 |
| 1,792,014 | Herrick | Feb. 10, 1931 |
| 1,820,946 | Pitcairn | Sept. 1, 1931 |
| 1,848,321 | Cresci | Mar. 8, 1932 |
| 1,897,092 | Weir | Feb. 14, 1933 |
| 1,932,702 | Langdon | Oct. 31, 1933 |
| 2,001,529 | Dornier | May 14, 1935 |
| 2,254,963 | Hovland | Sept. 2, 1941 |
| 2,322,715 | Kloeren | June 22, 1943 |
| 2,330,056 | Howard | Sept. 21, 1943 |
| 2,395,435 | Thompson et al. | Feb. 26, 1946 |
| 2,397,357 | Kundig | Mar. 26, 1946 |
| 2,422,744 | O'Neill | June 24, 1947 |